E. F. HARRISON.
GATHERING APPARATUS.
APPLICATION FILED APR. 21, 1916.

1,337,452.

Patented Apr. 20, 1920.
3 SHEETS—SHEET 1.

WITNESSES

INVENTOR
Elmer F. Harrison
BY
ATTORNEY

E. F. HARRISON.
GATHERING APPARATUS.
APPLICATION FILED APR. 21, 1916.

1,337,452.

Patented Apr. 20, 1920.
3 SHEETS—SHEET 3.

UNITED STATES PATENT OFFICE.

ELMER F. HARRISON, OF ARTHUR, ILLINOIS.

GATHERING APPARATUS.

1,337,452.　　　　Specification of Letters Patent.　　Patented Apr. 20, 1920.

Application filed April 21, 1916. Serial No. 92,725.

*To all whom it may concern:*

Be it known that I, ELMER F. HARRISON, a citizen of the United States, residing at Arthur, in the county of Douglas and State of Illinois, have invented certain new and useful Improvements in Gathering Apparatus, of which the following is a specification.

This invention relates to a gathering apparatus and has for its principal object the production of efficient means for removing elements collected by gathering forks from such forks and the depositing of such elements upon conveyers.

Another object of this invention is the production of a gathering apparatus wherein a plurality of reciprocating rakes are provided, the rakes being arranged to remove elements gathered by the gathering forks and depositing such elements upon conveyers which extend from points immediately in the rear of the forks.

One practical form of construction and assembly of the present invention will be hereinafter described and is illustrated in the drawing, in which—

Figure 1:
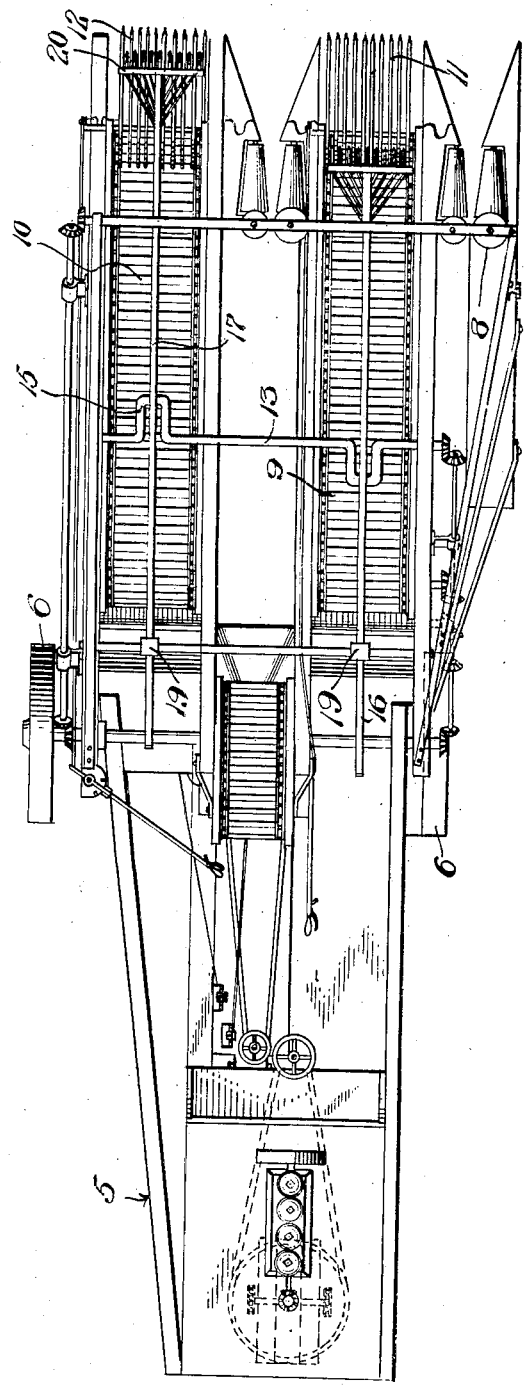
Figure 1 is a top plan view of the device.
Figure 2:
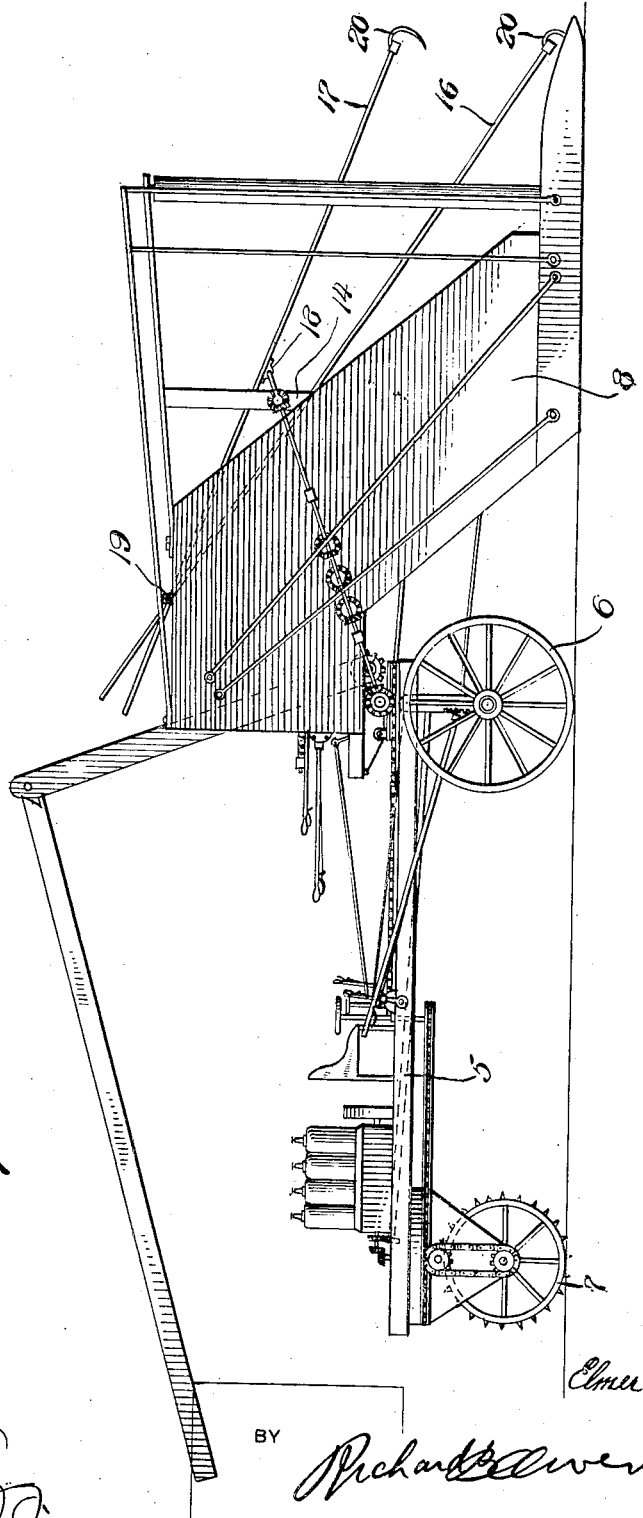
Fig. 2 is a side elevation of the structure.
Figure 3:
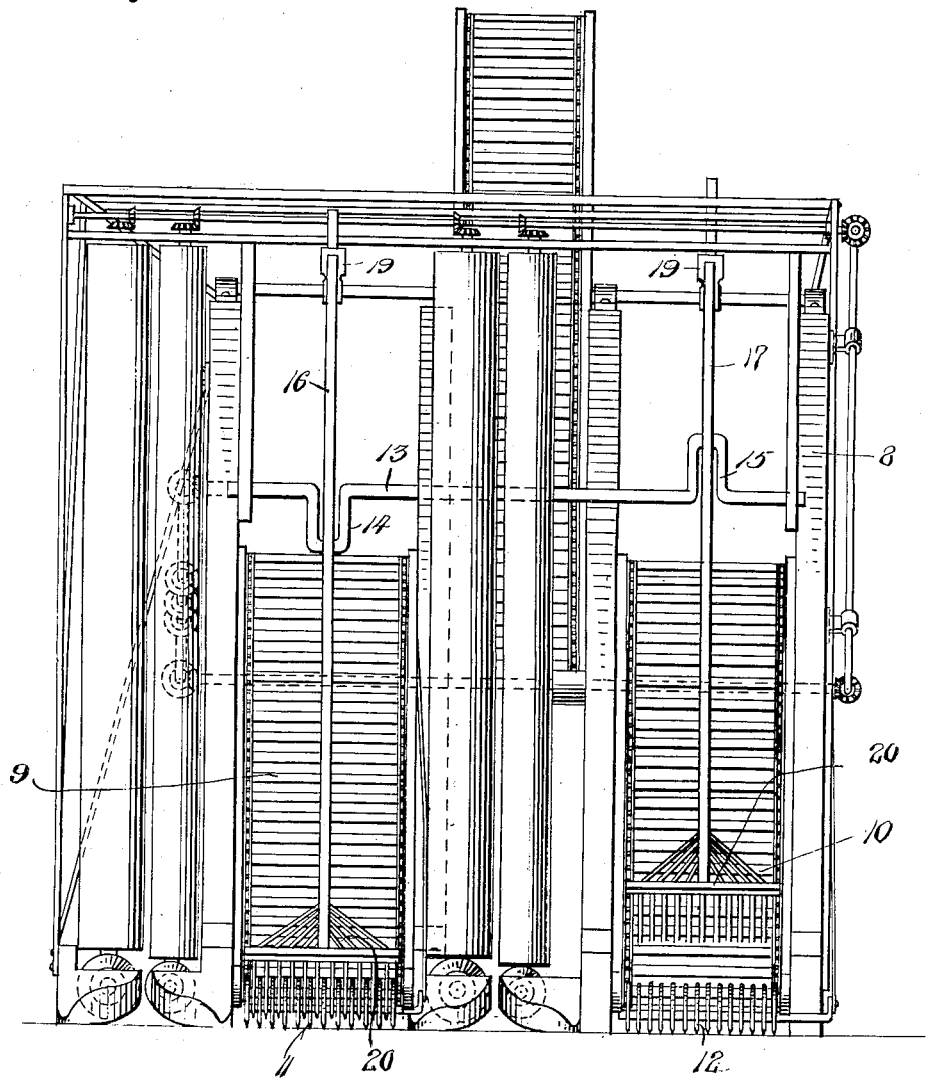
Fig. 3 is a front elevation of the gathering apparatus.

In the preferred embodiment of the present invention about to be described, in order to disclose a complete device, it will be seen that a suitable supporting frame 5 is provided having front supporting wheels 6 and a rear supporting wheel 7. The conveyer frame 8 is carried upon the forward portions of the supporting frame 5 and has conventional forms of conveyers 9 and 10 carried therein as shown in Figs. 1 and 3. Gathering forks 11 and 12 are carried at the lower forward ends of the conveyers 9 and 10. The description thus presented is of a general nature and it is designed to include any ordinary or preferred form of device, since the novelty of the invention resides in the specific manner in which the elements gathered by the gathering forks 11 and 12 are moved therefrom and deposited upon the conveyers 9 and 10.

A crank shaft 13 is rotatably supported by the conveyer frame 8 and may be driven by any suitable mechanism. This crank shaft 13 has cranks 14 and 15. Rake bars 16 and 17 are connected by suitable brackets 18 or by other suitable connecting elements to the rake bars 16 and 17. Guide members 19 are carried by the upper portions of the conveyer frame 8 as shown in Fig. 3 and the rake bars extend through the guide members 19. Rake heads 20 are carried upon the forward ends of the rake bars 16 and 17 as shown in the several figures of the drawing.

When the device is in operation, the main frame may be moved forwardly by any suitable power and thus the conveyer frame will be moved forwardly. As this movement takes place, the crank shaft 13 may be driven by an internal combustion engine as shown in the drawing or any other suitable means, thus causing the cranks 14 and 15 to reciprocate the rake bars 16 and 17, thus reciprocating the rake heads at the forward ends of these bars. As elements, such for instance as ears of corn, are gathered on the forks 11 and 12, it will be noted that the rakes will first be moved along the gathering forks and then move upward for a distance along the conveyer for moving the ears of corn from the gathering forks onto the conveyers and then the rakes, each moving in the arc of a circle, will return downwardly to the forward ends of the gathering forks as shown in the drawing.

It will thus be seen that efficient means are provided for moving the elements gathered by the forks therefrom and depositing the same upon the conveyers.

I claim:—

In a device of the class described, the combination of an endless conveyer, means for driving said conveyer; of a crank shaft having a crank, a rake comprising a plurality of teeth and having a bar connected to said crank, rigid means for slidably supporting said bar, a fork having a plurality of tines extending above the forward portion of the conveyer and then gradually slanted downwardly into engagement with the road of travel, said crank being of sufficient length so as to cause the rake to move along the fork so that the teeth of the rake will pass between the tines of the fork and then upwardly over the forward portion of the conveyer for moving elements from the fork onto the conveyer.

In testimony whereof I affix my signature in presence of two witnesses.

ELMER F. HARRISON.

Witnesses:
　MARTIN A. AAMY,
　RUDOLPH M. CORBETT.